United States Patent
Wei et al.

(10) Patent No.: US 9,256,227 B1
(45) Date of Patent: Feb. 9, 2016

(54) SYSTEM AND METHOD FOR CONTROLLING THE OPERATION OF A MACHINE

(71) Applicant: Caterpillar Inc., Peoria, IL (US)

(72) Inventors: Mo Wei, Dunlap, IL (US); Michael Taylor, Swissvalle, PA (US); Thandava K. Edara, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/484,586

(22) Filed: Sep. 12, 2014

(51) Int. Cl.
| | |
|---|---|
| G06F 7/70 | (2006.01) |
| G06F 19/00 | (2011.01) |
| G06G 7/00 | (2006.01) |
| G06G 7/76 | (2006.01) |
| G05D 1/02 | (2006.01) |
| G05B 15/02 | (2006.01) |
| G05D 1/00 | (2006.01) |
| B60L 15/20 | (2006.01) |

(52) U.S. Cl.
CPC .............. *G05D 1/0223* (2013.01); *G05B 15/02* (2013.01); *G05D 1/0027* (2013.01); *B60L 15/20* (2013.01)

(58) Field of Classification Search
USPC ............ 701/24, 50, 94, 96, 36, 300; 340/992, 340/994; 700/56, 97; 702/33; 705/7.13, 705/7.16, 7.11, 7.12, 7.17; 342/457, 342/357.21; 455/418–420; 382/103, 104, 382/106
See application file for complete search history.

(56) References Cited

U.S. PATENT DOCUMENTS

| | | | |
|---|---|---|---|
| 5,551,524 A | 9/1996 | Yamamoto et al. | |
| 5,864,970 A | 2/1999 | Maddock et al. | |
| 6,101,479 A * | 8/2000 | Shaw | G06Q 10/06 705/7.12 |
| 6,167,336 A | 12/2000 | Singh et al. | |
| 6,246,932 B1 * | 6/2001 | Kageyama et al. | 701/24 |
| 6,256,773 B1 * | 7/2001 | Bowman-Amuah | G06F 8/71 707/999.202 |
| 6,324,647 B1 * | 11/2001 | Bowman-Amuah | H04L 12/58 709/223 |
| 6,370,573 B1 * | 4/2002 | Bowman-Amuah | G06F 8/20 709/223 |
| 6,445,310 B1 | 9/2002 | Bateman et al. | |
| 6,601,233 B1 * | 7/2003 | Underwood | G06F 8/24 717/100 |
| 6,845,311 B1 | 1/2005 | Stratton et al. | |
| 6,889,096 B2 * | 5/2005 | Spriggs | G05B 15/02 340/3.71 |

(Continued)

FOREIGN PATENT DOCUMENTS

| | | | | |
|---|---|---|---|---|
| JP | 11161895 A | * | 6/1999 | ............. B60K 31/00 |
| JP | 2008241349 A | * | 10/2008 | ............. G01C 21/00 |
| JP | 2010216831 A | * | 9/2010 | ............. G01C 21/00 |

OTHER PUBLICATIONS

Threshold- and information-based holding at multiple stops; Bellei, G.; Gkoumas, K.; Intelligent Transport Systems, IET Year: 2009, vol. 3, Issue: 3; pp. 304-313, DOI: 10.1049/iet-its.2008.0072; IET Journals & Magazines.*

(Continued)

*Primary Examiner* — Cuong H Nguyen
(74) *Attorney, Agent, or Firm* — Leydig Voit & Mayer, Ltd.

(57) ABSTRACT

A system for controlling at least one machine at a work site includes a controller configured to store a map of a boundary of a work area at the work site. The controller determines a first arrival time for a first machine to arrive at the boundary and a second arrival time for a second machine to arrive at the boundary. An arrival interval is determined based upon a difference between the first arrival time and the second arrival time the relative travel speed between the first machine and the second machine is adjusted so that the machines arrive at a desired arrival interval.

20 Claims, 4 Drawing Sheets

(56) References Cited

U.S. PATENT DOCUMENTS

| | | | |
|---|---|---|---|
| 6,957,186 B1* | 10/2005 | Guheen | G06Q 90/20 |
| | | | 705/323 |
| 7,216,033 B2 | 5/2007 | Flann et al. | |
| 7,504,966 B2* | 3/2009 | Horstemeyer | 340/994 |
| 7,578,079 B2 | 8/2009 | Furem | |
| 7,734,398 B2 | 6/2010 | Manneppalli | |
| 7,937,281 B2* | 5/2011 | Miller | G06Q 10/06 |
| | | | 705/7.12 |
| 7,979,175 B2 | 7/2011 | Allard et al. | |
| 8,073,584 B2 | 12/2011 | Marty et al. | |
| 8,139,108 B2 | 3/2012 | Stratton et al. | |
| 8,351,684 B2 | 1/2013 | Clar et al. | |
| 8,456,327 B2 | 6/2013 | Bechtel et al. | |
| 8,620,535 B2 | 12/2013 | Friend et al. | |
| 8,781,882 B1* | 7/2014 | Arboletti | G06Q 10/0639 |
| | | | 705/7.11 |
| 2007/0129869 A1 | 6/2007 | Gudat et al. | |
| 2008/0042883 A1* | 2/2008 | Horstemeyer | 340/994 |
| 2008/0180523 A1 | 7/2008 | Stratton et al. | |
| 2009/0043462 A1 | 2/2009 | Stratton et al. | |
| 2009/0202109 A1 | 8/2009 | Clar et al. | |
| 2010/0076708 A1* | 3/2010 | Hukkeri et al. | 702/94 |
| 2010/0076709 A1* | 3/2010 | Hukkeri et al. | 702/94 |
| 2010/0250023 A1 | 9/2010 | Gudat | |
| 2011/0093171 A1 | 4/2011 | Saposnik | |
| 2012/0089293 A1 | 4/2012 | Halder et al. | |
| 2012/0139325 A1 | 6/2012 | Norberg et al. | |
| 2012/0154572 A1 | 6/2012 | Stratton et al. | |
| 2012/0215378 A1 | 8/2012 | Sprock et al. | |
| 2014/0012404 A1 | 1/2014 | Taylor et al. | |
| 2014/0032030 A1 | 1/2014 | Stratton et al. | |
| 2014/0032058 A1 | 1/2014 | Stratton et al. | |
| 2014/0032132 A1 | 1/2014 | Stratton et al. | |
| 2014/0039986 A1* | 2/2014 | Handley | G06Q 10/0639 |
| | | | 705/7.42 |

OTHER PUBLICATIONS

DORA: Dynamic Optimal Random Access for Vehicle-to-Roadside Communications; Man Hon Cheung; Fen Hou; Wong, V.W.S.; Jianwei Huang; Selected Areas in Communications, IEEE Journal on; Year: 2012, vol. 30, Issue: 4; pp. 792-803, DOI: 10.1109/JSAC.2012.120513.*

DORA: Dynamic Optimal Random Access for Vehicle-to-Roadside Communications; Man Hon Cheung, Student Member, IEEE, Fen Hou, Member, IEEE, Vincent W.S. Wong, Senior Member, IEEE, and Jianwei Huang, Senior Member, IEEE; IEEE Journal on Selected Areas in Communications, vol. 30, No. 4, May 2012, pp. 792-803.*

Threshold- and information-based holding at multiple stops; G. Bellei K. Gkoumas; from www.ietdl.org; Published in IET Intelligent Transport Systems; received on Aug. 28, 2008—vPublished in IET Intelligent Transport Systems Received on Aug. 28, 2008 Revised on May 1, 2009 doi: 10.1049/iet-its.2008.0072.*

Monitoring and transmission of heavy vehicle parameters using fixed cellular terminal; Gogate, C.A.; Sagaidev, B.S.; Vaidyanathan, S.G.; Vehicular Technology Conference, 2004. VTC2004-Fall. 2004 IEEE 60th; Year: 2004, vol. 6; pp. 4100-4102 vol. 6, DOI: 10.1109/VETECF.2004.1404850.*

Automatic vehicle location (AVL) for transit operation; Greenfeld, J.; Electrotechnical Conference, 2000. MELECON 2000. 10th Mediterranean; Year: 2000, vol. 2; pp. 656-659 vol. 2, DOI: 10.1109/MELCON.2000.880019.*

Intelligent time of arrival estimation; Fagan, D.; Meier, R.; Integrated and Sustainable Transportation System (FISTS), 2011 IEEE Forum on; Year: 2011; pp. 60-66, DOI: 10.1109/FISTS.2011.5973595.*

* cited by examiner

SYSTEM AND METHOD FOR CONTROLLING THE OPERATION OF A MACHINE

TECHNICAL FIELD

This disclosure relates generally to controlling a machine and, more particularly, to a system and method for coordinating the operation of a plurality of machines.

BACKGROUND

Machines such as dozers, motor graders, wheel loaders, etc., are used to perform a variety of tasks. For example, these machines may be used to move material at a work site. The machines may operate in an autonomous or semi-autonomous manner to perform these tasks in response to commands generated as part of a work plan for the machines. The machines may receive instructions in accordance with a work plan to perform operations including digging, loosening, carrying, etc., different materials at the work site, such as those related to mining, earthmoving and other industrial activities.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

In some circumstances, machines may be operated autonomously in one area of a work site and by remote control in a second area. An operator may be responsible for remotely controlling more than one machine at the second area. If the operator is already remotely controlling one machine as a second machine approaches the second area, the second machine will be required to idle and wait for the operator to complete the remote operation of the first machine. Idling while waiting for the remote control operator may increase fuel usage and cause additional wear when propulsion of the machine resumes.

U.S. Pat. No. 6,845,311 discloses a control system for a work machine. A positioning system determines a relative location of the work machine within a work site and produces a machine position signal. A site model contains data related to a condition of the material at the work site. A controller of the control system is coupled to the site model, receives the machine position signal, determines a current condition of the material as a function of the position signal and the site model, and controls the work machine as a function of the current condition of the material.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for controlling at least one machine at a work site includes a first position sensor associated with a first machine for generating first position signals indicative of a position of the first machine and a second position sensor associated with a second machine for generating second position signals indicative of a position of the second machine. A controller is configured to store a map of a boundary of a work area at the work site and a predetermined arrival interval threshold. The controller is further configured to receive the first position signals from the first position sensor, determine the position of the first machine based upon the first position signals, generate first propulsion commands to propel the first machine towards the boundary, and determine a first arrival time for the first machine to arrive at the boundary. The controller is also configured to receive the second position signals from the second position sensor, determine the position of the second machine based upon the second position signals, generate second propulsion commands to propel the second machine towards the boundary, and determine a second arrival time for the second machine to arrive at the boundary. The controller is configured to determine an arrival interval based upon a difference between the first arrival time and the second arrival time, compare the arrival interval to the predetermined arrival interval threshold, and adjust a relative travel speed between the first machine and the second machine to define an adjusted arrival interval that exceeds the predetermined arrival interval threshold.

In another aspect, a controller implemented method of controlling at least one machine at a work site includes storing a map of a boundary of a work area at the work site, storing a predetermined arrival interval threshold, receiving first position signals from a first position sensor associated with a first machine indicative of a position of the first machine. The method further includes determining the position of the first machine based upon the first position signals, generating first propulsion commands to propel the first machine towards the boundary, and determining a first arrival time for the first machine to arrive at the boundary. The method also includes receiving second position signals from a second position sensor associated with a second machine indicative of a position of the second machine, determining the position of the second machine based upon the second position signals, generating second propulsion commands to propel the second machine towards the boundary, and determining a second arrival time for the second machine to arrive at the boundary. The method includes determining an arrival interval based upon a difference between the first arrival time and the second arrival time, comparing the arrival interval to the predetermined arrival interval threshold, and adjusting a relative travel speed between the first machine and the second machine to define an adjusted arrival interval that exceeds the predetermined arrival interval threshold.

DETAILED DESCRIPTION

Figure 1:
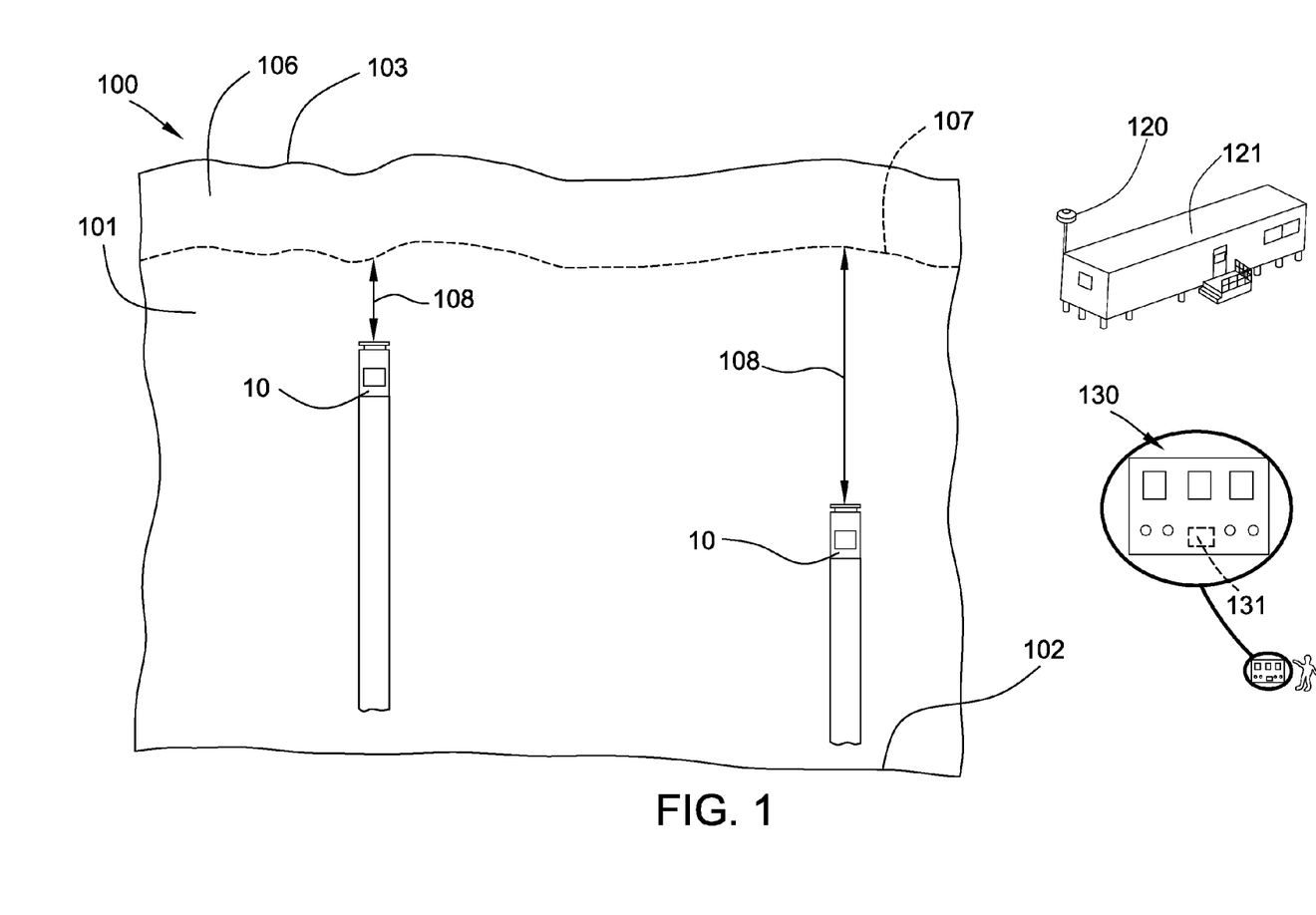
FIG. 1 depicts a schematic illustration of a work site at which a system incorporating the principles disclosed herein may be used.

FIG. 1 depicts a diagrammatic illustration of a work site 100 at which one or more machines 10 may operate in an autonomous, a semi-autonomous, or a manual manner. Work site 100 may be a portion of a mining site, a landfill, a quarry, a construction site, or any other area in which movement of material is desired. Tasks associated with moving material may include a dozing operation, a grading operation, a leveling operation, a bulk material removal operation, or any other type of operation that results in the alteration of the current topography at work site 100. As depicted, work site 100 includes a work area 101 having a high wall 102 at one end and a crest 103 such as an edge of a ridge, embankment, or other change in elevation at an opposite end. Material is moved generally from the high wall 102 towards the crest 103. The work surface 104 of the work area 101 may take any form and refers to the actual profile or position of the terrain of the work area.

Machine 10 may be configured to move material at the work site 100 according to one or more material movement plans from an initial location such as near the high wall 102 to a spread or dump location such as at crest 103. The material movement plans may include, among other things, forming a plurality of spaced apart channels or slots 110 that are cut into the work surface 104 at work site 100 along a path generally from the high wall 102 to the crest 103. In doing so, each machine 10 may move back and forth along a linear path generally between the high wall 102 and the crest 103.

As used herein, a machine 10 operating in an autonomous manner operates automatically based upon information received from various sensors without the need for human operator input. As an example, a haul or load truck that automatically follows a path from one location to another and dumps a load at an end point may be operating autonomously. A machine operating semi-autonomously includes an operator, either within the machine or remotely, who performs some tasks or provides some input and other tasks are performed automatically and may be based upon information received from various sensors. As an example, a load truck that automatically follows a path from one location to another but relies upon an operator command to dump a load may be operating semi-autonomously. In another example of a semi-autonomous operation, an operator may dump a bucket of an excavator in a load truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
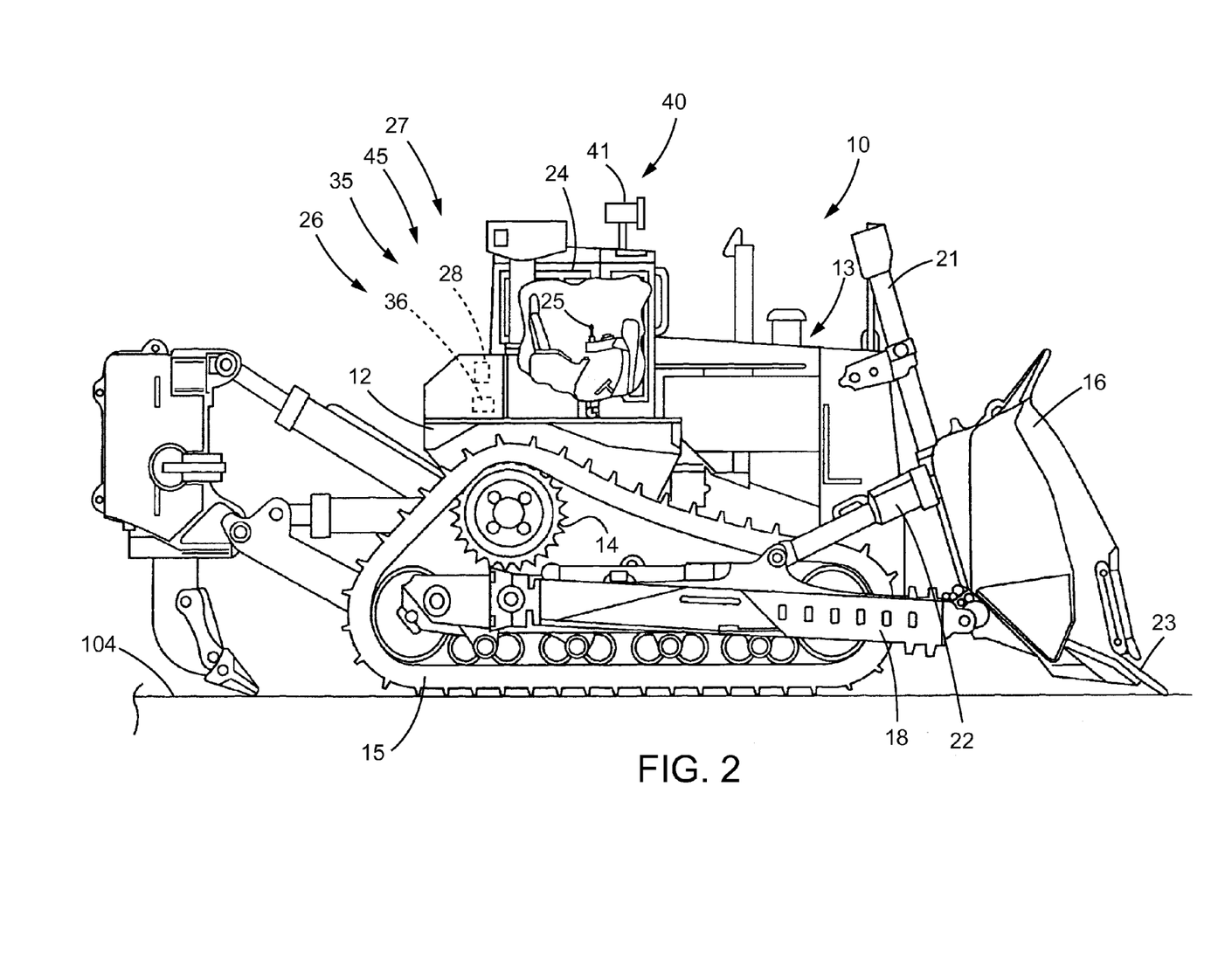
FIG. 2 depicts a diagrammatic illustration of a machine in accordance with the disclosure.

FIG. 2 depicts a diagrammatic illustration of a machine 10 such as a dozer with a ground engaging work implement such as a blade 16 configured for pushing material. The machine 10 includes a frame 12 and a prime mover such as an engine 13. A ground-engaging drive mechanism such as a track 15 may be driven by a drive sprocket 14 on opposite sides of machine 10 to propel the machine. Although machine 10 is shown in a "track-type" configuration, other configurations, such as a wheeled configuration, may be used. Operation of the engine 13 and a transmission (not shown), which are operatively connected to the drive sprockets 14 and tracks 15, may be controlled by a control system 35 including a controller 36. The systems and methods of the disclosure may be used with any machine propulsion and drivetrain mechanisms applicable in the art for causing movement of the machine including hydrostatic, electric, or mechanical drives.

Blade 16 may be pivotally connected to frame 12 by arms 18 on each side of machine 10. First hydraulic cylinder 21 coupled to frame 12 supports blade 16 in the vertical direction and allows blade 16 to move up or down vertically from the point of view of FIG. 2. Second hydraulic cylinders 22 on each side of machine 10 allow the pitch angle of blade tip 23 to change relative to a centerline of the machine.

Machine 10 may include a cab 24 that an operator may physically occupy and provide input to control the machine. Cab 24 may include one or more input devices such as joystick 25 through which the operator may issue commands to control the propulsion system and steering system of the machine as well as operate various implements associated with the machine.

Machine 10 may be controlled by a control system 35 as shown generally by an arrow in FIG. 2 indicating association with the machine 10. The control system 35 may include an electronic control module or controller 36 and a plurality of sensors. The controller 36 may receive input signals from an operator operating the machine 10 from within cab 24 or off-board the machine through a wireless communications system 120 (FIG. 1). The controller 36 may control the operation of various aspects of the machine 10 including the drivetrain and the hydraulic systems.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 and the controller 36 may be located on the machine 10 and may also include components located remotely from the machine such as at a command center 121 (FIG. 1) or at a remote control unit 130. The functionality of control system 35 may be distributed so that certain functions are performed at machine 10 and other functions are performed remotely. In such case, the control system 35 may include a communications system such as wireless communications system 120 (FIG. 1) for transmitting signals between the machine 10 and a system located remote from the machine. In one embodiment, remote control unit 130 (FIG. 2) positioned remote from the machine 10 may provide some or all of the specific commands that are then transmitted by the wireless communications system 120 to systems of the machine.

Machine 10 may be configured to be operated autonomously, semi-autonomously, or manually. When operating semi-autonomously or manually, the machine 10 may be operated by remote control and/or by an operator physically located within the cab 24.

Machine 10 may be equipped with a plurality of machine sensors 26, as shown generally by an arrow in FIG. 2 indicating association with the machine 10, that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 27, as shown generally by an arrow in FIG. 1 indicating association with the machine 10, may include a position sensor 28, also shown generally by an arrow in FIG. 1 to indicate association with the machine, to sense the position and orientation (i.e., the heading, pitch, roll or tilt, and yaw) of the machine relative to the work site 100. The position and orientation of the machine 10 are sometimes collectively referred to as the position of the machine. The position sensor 28 may include a plurality of individual sensors that cooperate to generate and provide position signals to controller 36 indicative of the position and orientation of the machine 10. In one example, the position sensor 28 may include one or more sensors that interact with a positioning system such as a global navigation satellite system or a global positioning system to operate as a position sensor. In another example, the position sensor 28 may further include a slope or inclination sensor such as pitch angle sensor for measuring the slope or inclination of the machine 10 relative to a ground or earth reference. The controller 36 may use position signals from the position sensors 28 to determine the position of the machine 10 within work site 100. In other examples, the position sensor 28 may include an odometer or another wheel rotation sensing sensor, a perception based system, or may use other systems such as lasers, sonar, or radar to determine all or some aspects of the position of machine 10.

In some embodiments, the position sensing system 27 may include a separate orientation sensing system. In other words, a position sensing system may be provided for determining the position of the machine 10 and a separate orientation sensing system may be provided for determining the orientation of the machine.

If desired, the position sensing system 27 may also be used to determine a ground speed of machine 10. Other sensors or a dedicated ground speed sensor may alternatively be used to determine the ground speed of the machine 10.

The machine 10 may include a visual image system 40 such as a camera system for generating visual images indicative of a point of view relative to the machine 10. The visual image system 40 may include a plurality of visual image sensors such as cameras 41 for generating visual image signals. The visual image signals may be transmitted wirelessly to a system remote from machine 10. The plurality of cameras 41 of the visual image system 40 may be positioned to capture different views that an operator would have from within the cab 24 of machine 10. If desired, a plurality of cameras 41 may also be positioned to provide a point of view including the machine 10 and/or the blade 16 as well as a portion of the work site 100 at which the machine is operating. The visual image system 40 may be desirable in a plurality of instances including when operating the machine 10 remotely via a remote control unit 130 (FIG. 1), when the visibility of an operator within the cab 24 is limited, or when personnel remote from the machine desire to observe the operation of the machine such as when the machine is operating autonomously.

In some situations when operating machines 10 at the work site 100 autonomously or semi-autonomously, it may be desirable to establish a controlled area or areas in which machines may only enter when operated manually (either with an operator in the cab 24 or by remote control). For example, a controlled area may be used as a buffer or crest zone 106 adjacent crest 103 to reduce the likelihood that the machines will move closer to crest 103 than desired. In such case, once reaching the crest zone 106, the machine 10 may only move forward towards the crest 103 when operated manually but may operate in reverse away from the crest 103 in a manual, autonomous, or semi-autonomous manner. In another example, a controlled area may be one in which certain types of obstacles such as personnel or buildings exist. In such case, it may be desirable to require manual operation for all movement of machine 10 within the controlled area.

As a further example, although crest 103 may define the edge of a ridge or embankment, an electronic map of the crest 103 stored within controller 36 or remotely in a system connected by the wireless network system 120 may vary from the actual crest position. Variations between the physical crest and the stored electronic map may be due to material that has been moved without a corresponding update of the map such as due to material being moved by another machine, due to shifting of the material or otherwise. Still further, errors may occur while setting, storing, transmitting or changing the electronic map. In other words, for a variety of reasons, the electronic map of the work area 101 stored within or remotely from the controller 36 may be different from the actual physical location of crest 103.

In one example, the controlled area may be crest zone 106 (FIG. 1) that extends a predetermined width or distance from the crest 103 into the work area 101. The width of the crest zone 106 or distance from the boundary 107 of the crest zone 106 to the crest 103 may be fixed for a particular work site 100, a particular work area 101, or may even change along the crest 103. Factors that influence the width of the crest zone 106 may include the height and angle of the slope adjacent the crest 103, environmental conditions in which the machine 10 is being operated as well as the type of material at the work area 101.

In instances in which an operator is responsible for a plurality of autonomous or semi-autonomous machines, control system 35 may include a planning or coordination system 45 that optimizes the speed of each machine so that they will arrive at the boundary 107 of the controlled area or crest zone 106 in a controlled or desired manner such as at staggered intervals. By arriving at staggered intervals, the amount of time a machine 10 must wait at the boundary 107 before being manually operated within the crest zone 106 may be minimized or eliminated. More specifically, referring to FIG. 1, in an example in which an operator is responsible for two machines 10, the controller 36 may determine the anticipated arrival time of each machine at the boundary 107 based upon the current travel speed of each. If the machines 10 were to arrive at the boundary 107 with an insufficient interval, the second to arrive machine would be stopped at the boundary until the operator was available to operate the second machine manually. Stopping a machine 10 at the boundary 107 results in the machine idling, which may waste fuel and cause increased wear on the machine each time movement of the machine is restarted.

In order to improve the efficiency of operation and reduce wear on the machines, the coordination system 45 may adjust the relative speed of the machines 10 so that the machines arrive at desired intervals. In one embodiment, the coordination system 45 may determine the distance of each machine 10 from the boundary 107 and determine an approximate arrival time for each machine based upon its distance from the boundary and its current travel speed.

Figure 3:
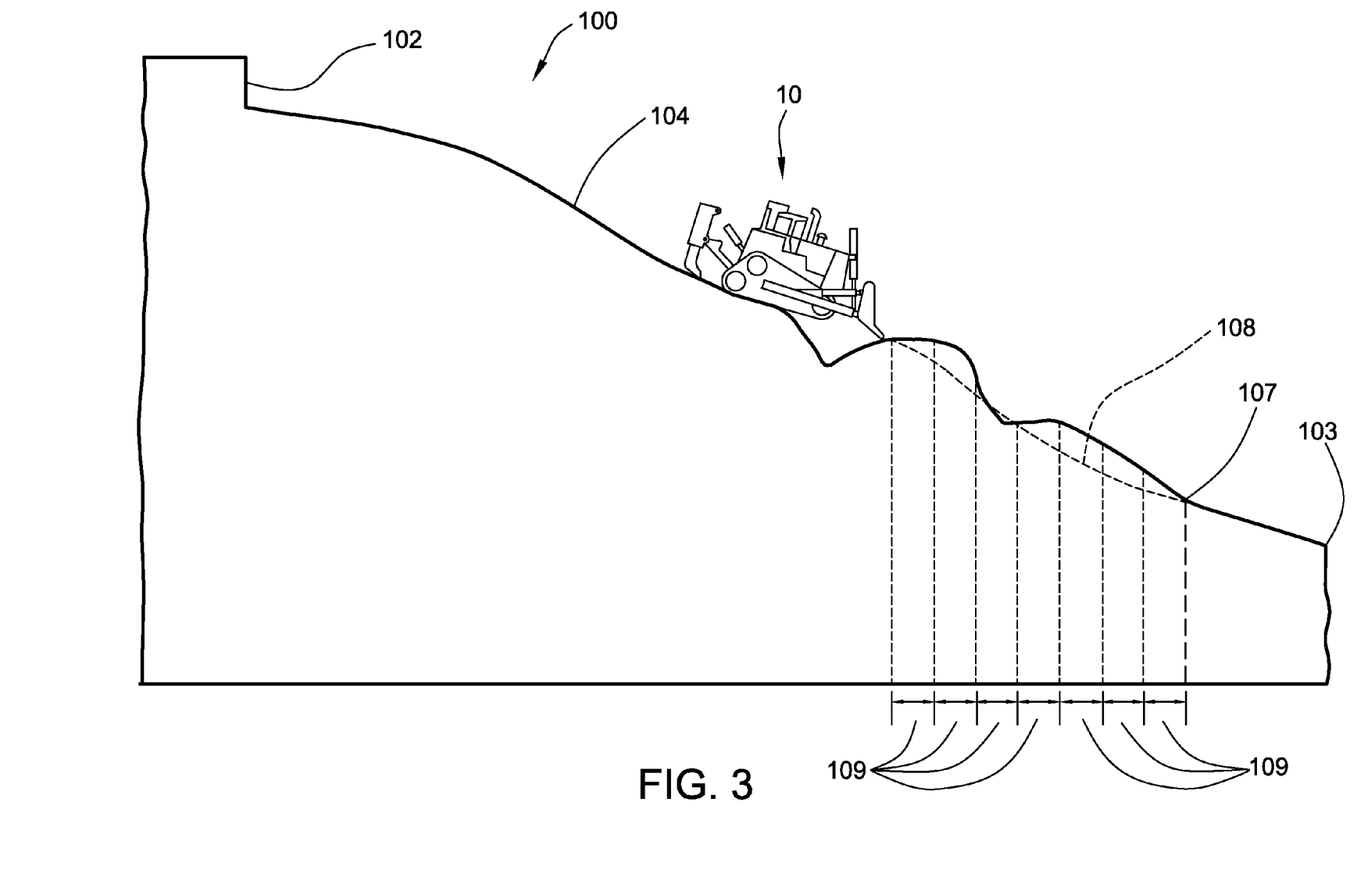
FIG. 3 depicts a cross-section of a portion of a work site depicting various aspects of a material moving plan.

In another embodiment, the coordination system 45 may analyze the specific terrain or topography over which each machine 10 will be traveling towards the crest zone 106 to determine the length of time required to reach the boundary 107. Referring to FIG. 3, the path 108 along which the blade 16 of each machine 10 will travel may be divided into a plurality of increments 109 of a predetermined length. The coordination system 45 may analyze one or more increment parameters such as the slope and curvature of each path increment, the material characteristics of the material 105, and/or the operation being performed at each increment (e.g., cut or carry) to determine the length of time required for each machine 10 to travel along or traverse each increment 109.

When propelling the machine 10, the propulsive force provided by the ground-engaging drive mechanism such as tracks 15 is limited by the resistive force of the material of the work surface 104. More specifically, if too much force is provided through tracks 15, the tracks will slip excessively and the machine 10 will operate in an inefficient manner. To maximize efficiency, it is often desirable to operate a machine 10 generally at the knee of an applicable pull-slip curve as is known in the art.

The increment parameters such as the slope and curvature of each increment 109 and the type of operation being performed as well as the material characteristics of the material 105 will affect the drawbar pull. For example, when operating a dozer, relatively hard material is slower to cut but is faster to carry. On the other hand, softer material is faster to cut but is relatively slower to carry. As a result, the controller 36 may use the slope, curvature, and material characteristics of each increment together with the operation being performed and a target range of draw bar pull to determine the expected speed of the machine 10 along each increment 109. In other words, the controller 36 may use a target draw bar pull range together with the slope, material characteristics of each increment 109, and the operation being performed to determine a target speed along each increment and use the target speed to determine the travel time along each increment. By adding the travel times for the plurality of increments 109 along the path, the coordination system 45 may determine the expected or anticipated arrival time for each machine 10 at the boundary 107.

The coordination system 45 may compare the anticipated arrival time of the machines 10 to determine an arrival interval equal to the difference between a first arrival time of the first machine at the boundary 107 and a second arrival time of the second machine at the boundary. If the arrival interval is less than a predetermined arrival interval threshold, the machines 10 will be arriving too close together and the later to arrive machine will need to wait until the first arrive machine is no longer under the operator's control. As a result, the coordination system 45 may adjust the relative travel speed between the first machine and the second machine so that an adjusted arrival interval exceeds the predetermined arrival interval threshold. In one example, the speed of the second machine may be reduced in order to increase the arrival interval as desired. In another example, it may be possible to increase the speed of the first machine to increase the arrival interval. It should be noted, however, that if the first machine is operating at an optimal rate, it may not be possible to efficiently or effectively increase the speed of the first machine.

As an example, if the desired arrival interval threshold is five minutes, the first machine 10 is expected to arrive at boundary 107 in one minute, and the second machine 10 is expected to arrive at the boundary in four minutes, the arrival interval will be three minutes. By reducing the speed of the second machine by 50%, the second machine will arrive at the boundary 107 in 6 minutes and thus the arrival interval between the first machine and the second machine will be increased to equal the desired arrival interval threshold. As a result, the second machine will not be required to idle at the boundary 107 which thus reduces fuel consumption and wear on the machine.

Although described in the context of two machines 10, the coordination system 45 may operate to dynamically manage any number of machines. For example, when managing three or more machines 10, the coordination system 45 may adjust the speed of one, two, or all three machines as desired.

Figure 4:
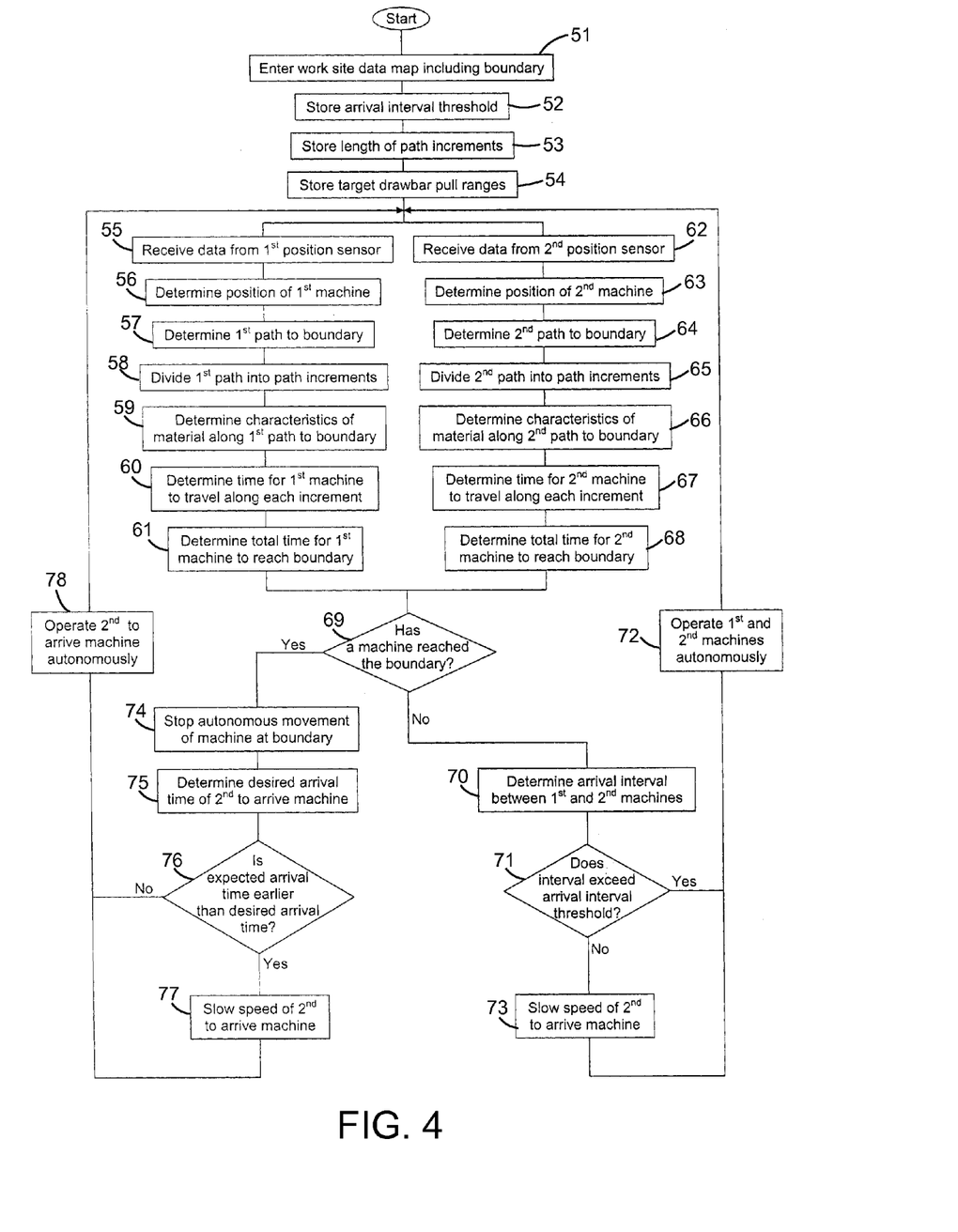
FIG. 4 depicts a flowchart illustrating a machine coordination process in accordance with the disclosure.

Referring to FIG. 4, a flowchart depicting a machine speed planning and adjustment process that may be used at work site 100 is depicted. At stage 51, an electronic map of the work site 100 may be entered in controller 36. The electronic map may include the position of a controlled area such as crest zone 106 including a boundary 107 separating the controlled area from the remainder of the work site. The electronic map may be generated in any desired manner including moving machines 10 autonomously about the work site 100 such as during a slot dozing operation. In an alternate step, an operator may manually operate machines 10, either within the cab 24 or by remote control, and the topography of the work site recorded. In still another alternate step, the electronic map of the work site 100 may be determined by moving a mapping vehicle (not shown) about the work site.

A plurality of operational parameters may be stored within controller 36 either by an operator, management personnel, or other personnel. For example, at stage 52, the desired arrival interval threshold may be stored within controller 36. The length of each path increment may be stored within controller 36 at stage 53. At 54, target draw bar pull ranges may be stored within controller 36 for each machine. The flowchart in FIG. 4 depicts operation with only two machines 10 but the coordination system 45 may operate to control any number of machines.

At stage 55, the controller 36 may receive position signals from the position sensor 28 on the first machine 10 indicative of the position of the first machine. At stage 56, the controller 36 may determine the position of the first machine 10 based upon the position signals from the position sensor 28 on the first machine. The controller 36 may determine at stage 57 the path of the first machine 10 to the boundary 107. At stage 58, the controller 36 may divide the path of the first machine 10 into a plurality of path increments based upon the increment length set at stage 53.

At stage 59, the controller 36 may determine the characteristics of the work surface 104 along each path increment. For example, each path increment may include its own slope and angular orientation relative to a horizontal reference together with its material characteristics. At stage 60, the controller 36 may determine an expected travel time for the machine 10 to travel along each path increment. The expected travel time may be based upon the slope and angular orientation of the increment, the material characteristics of the material 105 to be moved, the operation being performed by the machine (e.g., cut or carry), and the desired target draw bar pull range. At stage 61, the travel time along each of the path increments may be added together to determine the total time for the first machine 10 to reach the boundary 107. The total travel time may be added to the current time to determine the expected arrival time of the first machine at the boundary 107.

The process for determining the position of the second machine and the total time until the second machine reaches boundary 107 is identical to stages 55-61 and is reflected as stages 62-68.

At stage 69, the controller 36 may determine whether either the first or second machine has reached the boundary 107. If neither machine has reached the boundary 107, the controller 36 may determine at stage 70 the arrival interval between the first to arrive machine and the second to arrive machine. To do so, the controller 36 may determine the expected arrival time of the first machine based upon its position as determined at stage 56 and the expected total travel time required to reach the boundary 107 as determined at stage 61. Similarly, the controller 36 may determine the expected travel time of the second machine based upon its position as determined at stage 63 and the expected total travel time required to reach the boundary 107 as determined at stage 68. The arrival interval is equal to the difference between the expected arrival times of the two machines at the boundary 107.

At decision stage 71, the controller 36 may determine whether the arrival interval exceeds the arrival interval threshold. If the arrival interval exceeds the arrival interval threshold, the controller 36 may at stage 72 continue to operate the first and second machines autonomously such as by providing propulsion commands to propel the machines towards boundary 107 according to a desired material movement plan.

If the arrival interval does not exceed the arrival interval threshold at decision stage 71, the coordination system 45 may slow at stage 73 the second to arrive machine. To do so, the controller 36 may reduce the target draw bar pull by a predetermined percentage, reduce the engine speed by a predetermined percentage, or reduce the travel speed of the second to arrive machine in any other desired manner. At stage 72, the first to arrive machine may continue to be operated autonomously according to the material movement plan and the second or later to arrive machine may be operated autonomously at the reduced speed as determined at stage 73.

If either the first or second machine has reached the boundary 107 at decision stage 69, autonomous movement of the machine reaching the boundary may be terminated at stage 74. At stage 75, the controller 36 may determine the desired arrival time at the boundary 107 of the machine that is still being operated autonomously (i.e., the second to arrive machine). The desired arrival time may be determined by adding the arrival interval threshold to the time at which the first to arrive machine reached the boundary 107. In other words, since it is desired for the second to arrive machine to reach the boundary 107 a predetermined time (equal to the arrival interval threshold) after the first to arrive machine reached the boundary, the desired arrival time for the second to arrive machine is the arrival time of the first machine plus the arrival interval threshold.

At decision stage 76, the controller 36 may determine whether the second to arrive machine will arrive at the boundary 107 before the desired arrival time. If the second to arrive machine will arrive before the desired arrival time, the controller 36 may slow down at stage 77 the speed of the second to arrive machine as described above with respect to stage 73. At stage 78, the second to arrive machine may be operated autonomously at the reduced speed and travel towards boundary 107. If the controller 36 determines at decision stage 76 that the second to arrive machine will arrive at the boundary 107 on or after the desired arrival time, the second to arrive machine may be operated autonomously at stage 78 such as by providing propulsion commands to propel the machines towards boundary 107.

The second to arrive machine may continue to be operated autonomously until it reaches boundary 107. In addition, if the first to arrive machine exits the controlled area such as crest zone 106, the process of stages 55-61 may begin again. It should be noted that in instances in which the machines are configured to operate in reverse autonomously or semi-autonomously such as within the crest zone 106, controller 36 may be configured to begin the process of stages 55-61 once the first to arrive machine has begun to operate autonomously or semi-autonomously in reverse and the second to arrive machine may be operated at the speed designated by the material movement plan (i.e., not the reduced speed) since the operator's attention may be safely focused on the second to arrive machine once it arrives at the boundary 107.

INDUSTRIAL APPLICABILITY

The industrial applicability of the system described herein will be readily appreciated from the forgoing discussion. The foregoing discussion is applicable to systems in which a plurality of machines 10 are operated autonomously or semi-autonomously at a work site 100. Such system may be used at a mining site, a landfill, a quarry, a construction site, a roadwork site, a forest, a farm, or any other area in which movement of machines is desired.

In some operating environments, machines may only be permitted to enter a restricted or controlled areas while under manual control (e.g., remote control) of an operator. If an operator is responsible for a plurality of autonomously or semi-autonomously operated machines 10, some machines may be required to idle outside the controlled area while awaiting manual operation by the operator. Such idling may increase fuel consumption and increase the wear on the machine 10 due to starting and stopping of propulsion of the machine.

In order to reduce idle time that a machine 10 may be required to wait for manual operation by an operator, coordination system 45 my operate to control the autonomous or semi-autonomous operation of the machines 10 by staggering their arrival times at the controlled area. By doing so, each machine 10 may arrive at the controlled area as the operator is completing manual control of another machine and thus is available to assume manual operation of the arriving machine in an efficient manner. Coordination system 45 may operate by slowing the speed of the latter to arrive machine 10.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for autonomously controlling at least one machine at a work site, comprising:
   a first position sensor associated with a first machine for generating first position signals indicative of a position of the first machine;
   a second position sensor associated with a second machine for generating second position signals indicative of a position of the second machine; and
   a controller configured to:
      store a map of a boundary of a work area at the work site;
      store a predetermined arrival interval threshold;
      receive the first position signals from the first position sensor;
      determine the position of the first machine based upon the first position signals;
      generate first propulsion commands to propel the first machine towards the boundary;
      determine a first arrival time for the first machine to arrive at the boundary;
      receive the second position signals from the second position sensor;
      determine the position of the second machine based upon the second position signals;
      generate second propulsion commands to propel the second machine towards the boundary;
      determine a second arrival time for the second machine to arrive at the boundary;
      determine an arrival interval based upon a difference between the first arrival time and the second arrival time;
      compare the arrival interval to the predetermined arrival interval threshold; and
      adjust a relative travel speed between the first machine and the second machine to define an adjusted arrival interval that exceeds the predetermined arrival interval threshold;
      wherein the first machine and the second machine are earthmoving machines.

2. The system of claim 1, wherein the controller is further configured to divide a first path from the first machine to the boundary into a plurality of first path increments, divide a second path from the second machine to the boundary into a plurality of second path increments, determine based upon an increment parameter a first path increment travel time along each of the plurality of first path increments to define a plurality of first path increment travel times and a second path increment travel time along each of the plurality of second path increments to define a plurality of second path increment travel times, and determine the first arrival time based upon the plurality of first path increment travel times and determine the second arrival time based upon the plurality of second path increment travel times.

3. The system of claim 2, wherein the controller is further configured to determine a first target speed based upon a desired first target draw bar pull range for the first machine and a second target speed based upon a desired a second target draw bar pull range for the second machine, and determine the first arrival time based upon a first distance of the first machine from the boundary and the first target speed and determine the second arrival time based upon a second distance of the second machine from the boundary and the second target speed.

4. The system of claim 3, wherein the increment parameter is at least one of a slope of a work surface of each increment and material characteristics along the work surface of each increment.

5. The system of claim 1, wherein the controller is configured to store a first target speed of the first machine and a second target speed of the second machine, and determine the first arrival time based upon a first distance of the first machine from the boundary and the first target speed and determine the second arrival time based upon a second distance of the second machine from the boundary and the second target speed.

6. The system of claim 1, wherein the controller is further configured to determine a first target speed based upon a desired first target draw bar pull range for the first machine and a second target speed based upon a desired a second target draw bar pull range for the second machine, and determine the first arrival time based upon a first distance of the first machine from the boundary and the first target speed and determine the second arrival time based upon a second distance of the second machine from the boundary and the second target speed.

7. The system of claim 1, wherein the relative travel speed between the first machine and the second machine is adjusted by slowing down one of the first machine and the second machine.

8. The system of claim 1, further including a work surface position sensor for generating work surface position signals indicative of a position of a work surface and the controller is further configured to receive the work surface position signals from the work surface position sensor, determine the position of the work surface based upon the work surface position signals, and determine the first arrival time and the second arrival time based upon the position of the work surface.

9. The system of claim 8, wherein the controller is further configured to determine the first arrival time based upon the position of the work surface along a first path from the first machine to the boundary and determine the second arrival time based upon the position of the work surface along a second path from the second machine to the boundary.

10. The system of claim 9, wherein the work surface position sensor includes a first work surface position sensor associated with the first machine to determine the position of the work surface along the first path and second work surface position sensor associated with the second machine to determine the position of the work surface along the second path.

11. The system of claim 9, wherein the controller is further configured to store a first target speed of the first machine and a second target speed of the second machine, and determine the first arrival time based upon the first target speed and determine the second arrival time based upon the second target speed.

12. The system of claim 9, wherein the controller is further configured to divide the first path into a plurality of first path increments, divide the second path into a plurality of second path increments, determine a first path increment travel time along each of the plurality of first path increments and a second path increment travel time along each of the plurality of second path increments based upon an increment parameter, and determine the first arrival time based upon the first path increment travel times and determine the second arrival time based upon the second path increment travel times.

13. The system of claim 10, wherein the increment parameter is at least one of a slope of the work surface along each increment and material characteristics of the work surface of each increment.

14. The system of claim 1, wherein the controller is further configured to terminate movement of each machine upon reaching the boundary.

15. A controller implemented method of autonomously controlling at least one machine at a work site, comprising:
   storing a map of a boundary of a work area at the work site;
   storing a predetermined arrival interval threshold;
   receiving first position signals from a first position sensor associated with a first machine indicative of a position of the first machine;
   determining the position of the first machine based upon the first position signals;
   generating first propulsion commands to propel the first machine towards the boundary;
   determining a first arrival time for the first machine to arrive at the boundary;
   receiving second position signals from a second position sensor associated with a second machine indicative of a position of the second machine;
   determining the position of the second machine based upon the second position signals;
   generating second propulsion commands to propel the second machine towards the boundary;
   determining a second arrival time for the second machine to arrive at the boundary;
   determining an arrival interval based upon a difference between the first arrival time and the second arrival time;
   comparing the arrival interval to the predetermined arrival interval threshold; and
   adjusting a relative travel speed between the first machine and the second machine to define an adjusted arrival interval that exceeds the predetermined arrival interval threshold;
   wherein the first machine and the second machine are earthmoving machines.

16. The method of claim 15, further including dividing a first path from the first machine to the boundary into a plurality of first path increments, dividing a second path from the second machine to the boundary into a plurality of second path increments, determining a first path increment travel time along each of the plurality of first path increments and a second path increment travel time along each of the plurality of second path increments, and determining the first arrival time based upon the plurality of first path increment travel times and determining the second arrival time based upon the plurality of second path increment travel times.

17. The method of claim 16, further including determining a first target speed based upon a desired first target draw bar pull range for the first machine and a second target speed based upon a desired a second target draw bar pull range for the second machine, and determining the first arrival time based upon a first distance of the first machine from the boundary and the first target speed and determining the second arrival time based upon a second distance of the second machine from the boundary and the second target speed.

18. The method of claim 15, further including storing a first target speed of the first machine and a second target speed of the second machine, and determining the first arrival time based upon a first distance of the first machine from the boundary and the first target speed and determining the second arrival time based upon a second distance of the second machine from the boundary and the second target speed.

19. The method of claim 15, wherein the relative travel speed between the first machine and the second machine is adjusted by slowing down one of the first machine and the second machine.

20. The method of claim 15, further including generating work surface position signals indicative of a position of a work surface along a first path from the first machine to the boundary and along a second path from the second machine to the boundary, determining a position of the work surface along the first path and the second path based upon the work surface position signals, and determining the first arrival time and the second arrival time based upon the position of the work surface along the first path and the second path.

* * * * *